United States Patent [19]

Belnap

[11] Patent Number: 5,691,629
[45] Date of Patent: Nov. 25, 1997

[54] NON-VOLATILE POWER SUPPLY HAVING ENERGY EFFICIENT DC/DC VOLTAGE CONVERTERS WITH A SMALL STORAGE CAPACITOR

[75] Inventor: Kevin Belnap, Layton, Utah

[73] Assignee: The United States of America as represented by the Secretary of the Air Force, Washington, D.C.

[21] Appl. No.: 505,718

[22] Filed: Jul. 13, 1995

[51] Int. Cl.⁶ .................................................. G05F 1/563
[52] U.S. Cl. .................................. 323/266; 363/65
[58] Field of Search .................... 307/46, 48, 66, 307/82; 323/222, 224, 266, 282; 363/65

[56] References Cited

U.S. PATENT DOCUMENTS

| | | | |
|---|---|---|---|
| 4,459,537 | 7/1984 | McWhorter | 323/224 |
| 4,533,986 | 8/1985 | Jones | 323/266 |
| 4,729,088 | 3/1988 | Wong | 323/224 |
| 4,743,835 | 5/1988 | Bosse et al. | 323/266 |
| 4,803,378 | 2/1989 | Richardson | 307/108 |
| 5,083,093 | 1/1992 | Adler et al. | 328/65 |
| 5,087,843 | 2/1992 | Narabu et al. | 307/607 |
| 5,089,727 | 2/1992 | Molitor et al. | 307/570 |
| 5,134,320 | 7/1992 | Perusse | 307/571 |
| 5,216,351 | 6/1993 | Shimoda | 323/224 |
| 5,406,471 | 4/1995 | Yamanaka | 323/224 |
| 5,436,550 | 7/1995 | Arakawa | 323/266 |
| 5,534,768 | 7/1996 | Chavannes et al. | 323/266 |

*Primary Examiner*—Jeffrey L. Sterrett
*Attorney, Agent, or Firm*—Robert L. Nathans

[57] ABSTRACT

A step-up DC/DC voltage convertor is coupled to a step-down DC/DC voltage convertor via a capacitor, which stores energy and maintains power flow to an output load circuit during a brief interruption of power supplied to the input of the step-up convertor. A diode connected to the capacitor prevents energy stored within the capacitor to be fed back to the step-up voltage convertor during the power interruption.

2 Claims, 1 Drawing Sheet

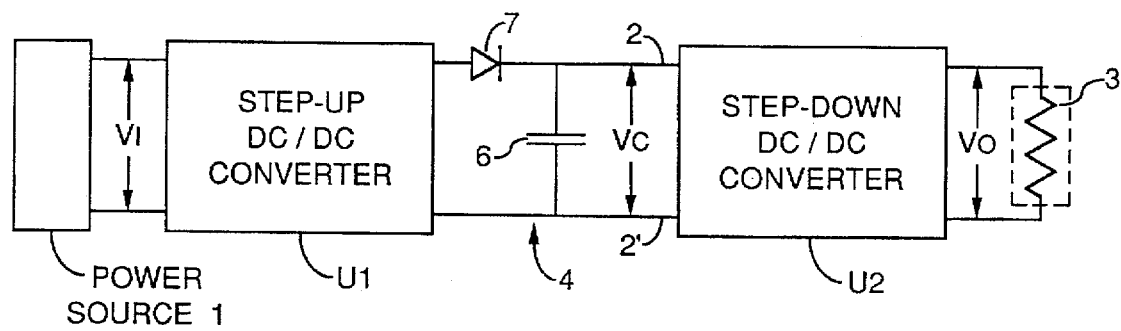

NON-VOLATILE POWER SUPPLY HAVING ENERGY EFFICIENT DC/DC VOLTAGE CONVERTERS WITH A SMALL STORAGE CAPACITOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of power supplies.

A common problem is the need to supply electrical power to a circuit for a limited time after power has been lost. One method of accomplishing this is to couple an energy storage capacitor across the input power supply terminals. Another method is to select a voltage higher than that needed by the circuit using an energy storage capacitor across the input supply terminals and employ a conventional linear voltage regulator to step the voltage down.

It would be desirable to solve this problem by the use of energy efficient DC/DC converters for allowing more energy to be transferred to the load circuit and generating less heat, rather than by using a conventional voltage regulator to step the voltage down. A typical DC/DC convertor has an efficiency of about 80%. It would be desirable to hold the circuit's voltage constant as long as possible after the power is lost, rather than using an energy storage capacitor alone. It would also be desirable to utilize a smaller energy storage capacitor connected across the input of the load circuit relative to the larger conventional energy storage capacitor coupled across the input power supply terminals. This would save space which is at a premium in certain environments. In addition, it would be desirable to have the power supply voltage independent of the voltage needed by the circuit.

SUMMARY OF THE INVENTION

The aforesaid goals are accomplished by providing a coupling circuit for coupling the output terminals of a step-up voltage convertor to the input terminals of a step-down voltage convertor which supplies voltage to the load circuit. The coupling circuit comprises a small low capacity capacitor for supplying energy to the load via the step-down convertor, when the power fed to the step-up convertor is briefly interrupted. A diode prevents energy stored in the capacitor from being fed back to the step-up convertor.

BRIEF DESCRIPTION OF THE DRAWING

Other features of the invention will become more apparent upon study of the sole FIGURE taken in conjunction with the following detailed description.

DETAILED DESCRIPTION

As indicated in the sole FIGURE, a conventional step-up DC/DC voltage convertor U1 has its input circuit coupled to a conventional power source 1, whereas a conventional step-down DC/DC convertor U2 has its output coupled to an output load circuit 3. A brief interruption of power flow from voltage supply 1 should not result in any interruption in power supplied to output load circuit 3, as stated hereinabove.

Coupling circuit 4 is connected between the output of convertor U1 and the input of convertor U2 and includes capacitor 6, coupled across the input terminals 2 and 2' of convertor U2, and further includes diode 7, which functions as a unidirectional impedance device for preventing energy stored in capacitor 6 from flowing back to convertor U1 upon a power interruption.

The energy E stored in capacitor 6 is given by $E=CV^2/2$, where C is the capacitance and V is the voltage across the capacitor. Thus, the higher the voltage applied across the capacitor, the higher the energy stored therein. This is due to the V squared term, which substantially reduces the capacitance needed to store a given amount of energy for higher voltages, and thus substantially reduces the size of the capacitor and the space it occupies. The circuit of the present invention exploits this relationship.

U1 steps the input voltage Vi up to the voltage across the capacitor Vc. U2 will step this voltage Vc down to the output voltage Vo. When the input voltage source 1 is turned off, the diode 7 prevents energy flow from the capacitor to U1. U2 will draw on the energy stored in the capacitor to supply the output load 3 with energy until Vo is about equal to Vc. At this point Vo will follow Vc downwardly until Vo and Vc equal zero.

Prior art DC/DC convertors are well known to those skilled in the art and thus details thereof have been omitted. See for example, the "Encyclopedia of Electronic Circuits", Tab Books, 1985, pages 210–211. See also: "The Power Supply Handbook", Tab Books Inc. (806), 1979, pages 319–321; "Switcher CAD User's Manual", Linear Technology Corp., 1992; "The Art of Electronics", Cambridge University Press, 1989, pages 355–361.

In accordance with a subsidiary aspect of the invention, U2 could be selected such that it functions as a step-down DC/DC convertor when Vc>Vo and switches to a step-up convertor when Vc<Vo. This will allow more energy to be drawn out of the capacitor than would be possible with only a step-down DC/DC convertor. This feature can be accomplished by a DC/DC converter in the "fly-back" topology.

It should now be appreciated that a smaller space-saving capacitance can be provided by the use of the novel temporary electrical energy supply means described and shown in the FIGURE in accordance with the invention. Thus the circuit is ideal where the size of the circuitry needs to be kept small. Also, the energy efficiency of DC/DC convertors allow more energy to be transferred to the load than by using a voltage regulator to step voltage down.

Since other embodiments of the invention will become apparent to the skilled workers in the art, the scope of the invention is to be limited only by the terms in the following claims and art recognized equivalents thereof.

What is claimed is:

1. Apparatus for supplying electrical power to a load circuit for a brief time after power is lost comprising:

(a) a step-up DC to DC voltage convertor;

(b) a step-down DC to DC voltage converter having an output circuit to be coupled to said load circuit;

(c) coupling circuit means for coupling an output circuit of said step-up voltage convertor to an input circuit of said step-down voltage convertor, said coupling means including an energy storage capacitor coupled across the input circuit of said step-down voltage convertor together with a unidirectional impedance means for preventing energy stored within said capacitor to be fed back to said step-up voltage convertor; and (d) means for causing said step-down convertor to operate as a step-up convertor when the voltage across said energy storage capacitor becomes less than the voltage across said output load circuit.

2. The combination as set forth in claim 1 wherein said unidirectional impedance means comprises a diode.

* * * * *